United States Patent
Chilikin et al.

(10) Patent No.: US 11,646,980 B2
(45) Date of Patent: May 9, 2023

(54) TECHNOLOGIES FOR PACKET FORWARDING ON INGRESS QUEUE OVERFLOW

(71) Applicant: Intel Corporation, Santa Clara, CA (US)

(72) Inventors: Andrey Chilikin, Limerick (IE); Vadim Sukhomlinov, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 470 days.

(21) Appl. No.: 15/941,969

(22) Filed: Mar. 30, 2018

(65) Prior Publication Data

US 2019/0306088 A1    Oct. 3, 2019

(51) Int. Cl.
| | | |
|---|---|---|
| *H04L 12/861* | (2013.01) | |
| *H04L 12/851* | (2013.01) | |
| *H04L 12/801* | (2013.01) | |
| *H04L 49/90* | (2022.01) | |
| *H04L 47/33* | (2022.01) | |
| *H04L 47/2441* | (2022.01) | |

(52) U.S. Cl.
CPC ...... *H04L 49/9089* (2013.01); *H04L 47/2441* (2013.01); *H04L 47/33* (2013.01); *H04L 49/9036* (2013.01); *H04L 49/9068* (2013.01)

(58) Field of Classification Search
CPC . H04L 49/9089; H04L 47/2441; H04L 47/33; H04L 49/9036; H04L 49/9068
USPC ........................................................ 370/230
See application file for complete search history.

(56) References Cited

U.S. PATENT DOCUMENTS

| | | |
|---|---|---|
| 6,760,775 B1 | 7/2004 | Anerousis et al. |
| 7,443,878 B2 | 10/2008 | Hendel et al. |
| 8,478,877 B2 | 7/2013 | Droux et al. |
| 8,762,534 B1 | 6/2014 | Hong et al. |
| 9,178,815 B2 | 11/2015 | Gasparakis et al. |
| 9,178,839 B2 | 11/2015 | Cardona et al. |
| 9,602,437 B1 | 3/2017 | Bernath |
| 2005/0033809 A1 | 2/2005 | McCarthy et al. |
| 2005/0129046 A1 | 6/2005 | Kumar et al. |

(Continued)

OTHER PUBLICATIONS

Final Office Action for U.S. Appl. No. 15/476,379, dated Oct. 20, 2020, 13 pages.

(Continued)

*Primary Examiner* — Faisal Choudhury
(74) *Attorney, Agent, or Firm* — Compass IP Law PC

(57) ABSTRACT

Technologies for packet forwarding under ingress queue overflow conditions includes a computing device configured to receive a network packet from another computing device, determine whether a global packet buffer of the NIC is full, and determine, in response to a determination that the global packet buffer is full, whether to forward all the global packet buffer entries. The computing device is additionally configured to compare, in response to a determination not to forward all the global packet buffer entries, a selection filter to one or more characteristics of the received network packet and forward, in response to a determination that the selection filter matches the one or more characteristics of the received network packet, the received network packet to a predefined output. Other embodiments are described herein.

23 Claims, 7 Drawing Sheets

(56) References Cited

U.S. PATENT DOCUMENTS

| | | | |
|---|---|---|---|
| 2007/0268925 A1* | 11/2007 | Sobelman | H04L 49/9036 370/412 |
| 2008/0263171 A1 | 10/2008 | Craft et al. | |
| 2011/0023042 A1 | 1/2011 | Pope et al. | |
| 2012/0307641 A1* | 12/2012 | Arumilli | H04L 43/16 370/241 |
| 2013/0107828 A1* | 5/2013 | Dinan | H04H 20/33 370/329 |
| 2014/0071866 A1* | 3/2014 | Maciocco | H04W 52/0229 370/311 |
| 2014/0161122 A1 | 6/2014 | Vasudevan | |
| 2014/0280709 A1 | 9/2014 | Li et al. | |
| 2015/0067229 A1 | 3/2015 | Connor et al. | |
| 2015/0271244 A1* | 9/2015 | Bloch | H04L 69/40 709/217 |
| 2016/0029179 A1* | 1/2016 | Kim | H04N 21/2385 370/312 |
| 2016/0062802 A1 | 3/2016 | Guan et al. | |
| 2016/0070598 A1 | 3/2016 | Vadkerti et al. | |
| 2016/0156462 A1 | 6/2016 | Winslow et al. | |
| 2016/0285971 A1 | 9/2016 | Bilas et al. | |
| 2016/0342437 A1* | 11/2016 | Khemani | G06F 9/45558 |
| 2016/0378565 A1 | 12/2016 | Che et al. | |
| 2017/0063979 A1* | 3/2017 | Saeki | H04L 67/1023 |
| 2017/0230451 A1 | 8/2017 | Paramasivam | |
| 2018/0131620 A1 | 5/2018 | Su et al. | |
| 2018/0210524 A1 | 7/2018 | Koenen et al. | |
| 2018/0270347 A1 | 9/2018 | Rangarajan et al. | |
| 2018/0285151 A1 | 10/2018 | Wang et al. | |
| 2018/0367460 A1 | 12/2018 | Gao et al. | |
| 2021/0141676 A1 | 5/2021 | Wang et al. | |

OTHER PUBLICATIONS

First Office Action for U.S. Appl. No. 15/476,379, dated Apr. 30, 2020, 12 pages.
First Office Action for U.S. Appl. No. 17/152,573, dated Sep. 15, 2022, 12 pages.

* cited by examiner

TECHNOLOGIES FOR PACKET FORWARDING ON INGRESS QUEUE OVERFLOW

BACKGROUND

Modern computing devices have become ubiquitous tools for personal, business, and social uses. As such, many modern computing devices are capable of connecting to various data networks, including the Internet, to transmit and receive data communications over the various data networks at varying rates of speed. To facilitate communications between computing devices, the data networks typically include one or more network computing devices (e.g., compute servers, storage servers, etc.) to route communications (e.g., via switches, routers, etc.) that enter/exit a network (e.g., north-south network traffic) and between network computing devices in the network (e.g., east-west network traffic). In present packet-switched network architectures, data is transmitted in the form of network packets between networked computing devices. At a high level, data is packetized into a network packet at a source computing device, which is then sent to a transmission component (e.g., a network interface controller (NIC) of the respective source computing device) responsible for dispatching the network packet to a target computing device over a network.

Upon receiving the network packets, the target computing device typically performs one or more operations to process at least a portion of each network packet. Such operations may be security operations, content verification operations, network packet characteristic identification operations, computation operations, etc. However, under certain conditions, network packets can be received from one or even several source computing devices at a high message rate, which can exhaust the resources of the target computing device and result in overflow. Such overflow conditions typically result in network packets being dropped, which can lead to a slowdown in the network due to timeouts and retransmissions, as well as have an impact on security. To address such issues, various techniques have been implemented, such as Ethernet flow control 802.3x and priority-based flow control (PFC) to slowdown packet transmission at the source computing devices, as well as watchdogs and software monitoring agents which check for the responsiveness of an application or monitor software and/or hardware telemetry. However, such implementations can have adverse side effects. For example, present PFC solutions can reduce total bandwidth, which can result in resources being underutilized. Additionally, such implementations may require a certain amount of time to have passed to validate a detrimental condition, which can result in a significant amount of network packets having been dropped during that elapsed amount of time.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
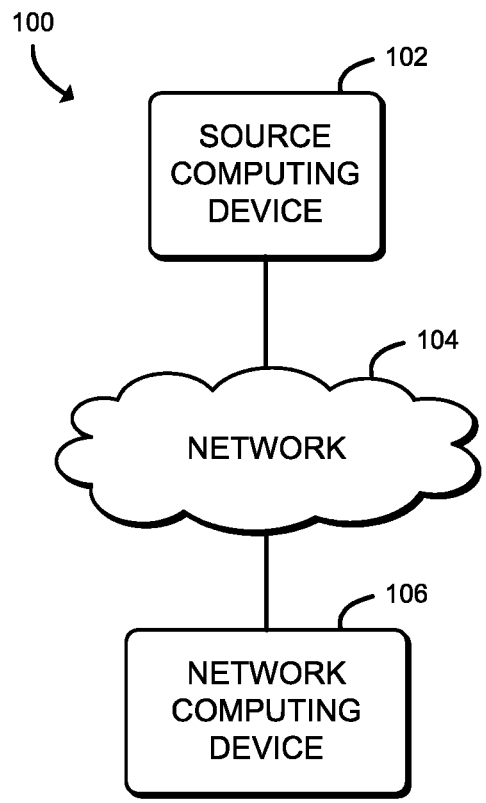
FIG. 1 is a simplified block diagram of at least one embodiment of a system for packet forwarding under ingress queue overflow conditions that includes a source computing device communicatively coupled to a network computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for packet forwarding under ingress queue overflow conditions includes a source computing device 102 communicatively coupled to a network computing device 106 via a network 104. In use, the network computing device 106 receives and processes network packets (e.g., messages, Ethernet frames, etc.) received from the source computing device 102. While illustratively shown as a single source computing device 102, it should be appreciated that the network computing device 106 may be receiving network packets from multiple source computing devices 102 at any given point in time. Under certain conditions, such as resource exhaustion, the network computing device 106 may receive network packets at a line rate faster than the network computing device 106 can process them, which can result in an overflow condition.

Under such conditions, the network computing device 106 is configured to detect an overflow condition is imminent (e.g., by monitoring ingress packet buffer queues) and direct the network packets to a different target. For example, if the network computing device 106 detects that the intended virtual function is not active (e.g., is not polling network packet queues, a receive network packet buffer watermark has been reached, receive descriptors are not available, etc.), the network computing device 106 is configured to redirect the network packet. Depending on the present available resources and/or configuration settings, the network computing device 106 may be configured to redirect the network packet internally (e.g., to another physical/virtual function), redirect the network packet externally (e.g., to another network computing device, a standby computing device, etc.), or drop the packet altogether.

Accordingly, the network computing device can provide a fine-grained level of the traffic being forwarded relative to existing fail to close/fail to open per the port. For example, only traffic for specific queues or virtual switch interfaces would be forwarded. Further, this can be extended to forward only specific traffic classes, Ethertypes, or IP protocols. In an illustrative example in which control and user plane packets processed on the same virtual function, only the control packets will be forwarded to the configured destination. Such control packets can be detected by specific Ethertype, Point-to-Point Protocol over Ethernet (PPPoE) discovery, by specific IP protocol, Stream Control Transmission Protocol (SCTP), virtual local area network (VLAN)/Multiprotocol Label Switching (MPLS), etc.

The source computing device 102 may be embodied as any type of computation or computer device capable of performing the functions described herein, including, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, a server (e.g., stand-alone, rack-mounted, blade, etc.), a network appliance (e.g., physical or virtual), a web appliance, a distributed computing system, a processor-based system, and/or a multiprocessor system. The target computing device 106 may be embodied as any type of computation or computer device capable of performing the functions described herein, including, without limitation, a server (e.g., stand-alone, rack-mounted, blade, sled, etc.), switch (e.g., a disaggregated switch, a rack-mounted switch, a standalone switch, a fully managed switch, a partially managed switch, a full-duplex switch, and/or a half-duplex communication mode enabled switch), a router, a gateway, a network appliance (e.g., physical or virtual), a web appliance, a distributed computing system, a processor-based system, and/or a multiprocessor system.

Figure 2:
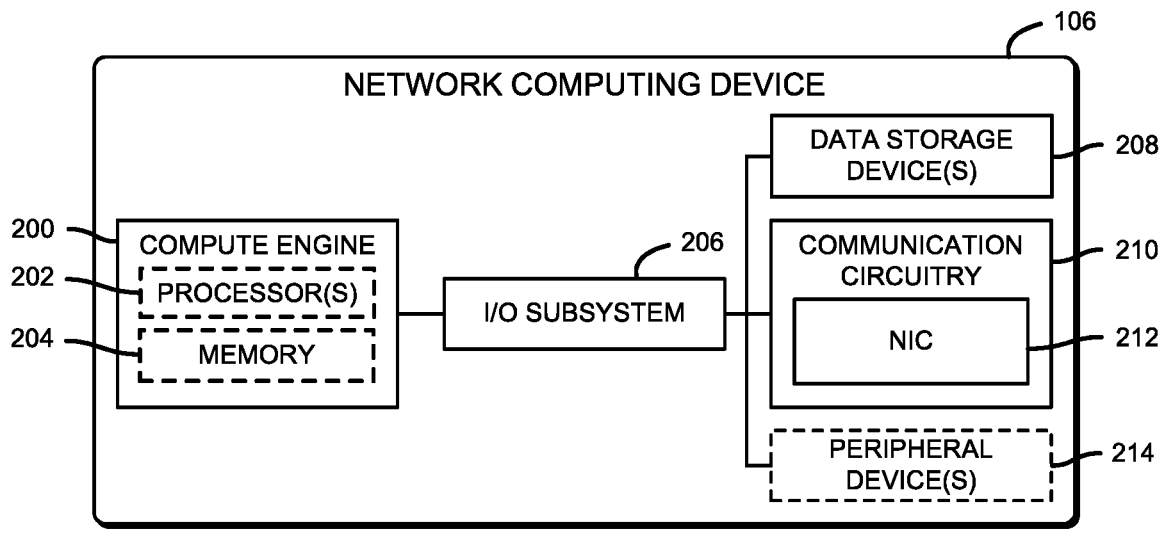
FIG. 2 is a simplified block diagram of at least one embodiment of the network computing device of the system of FIG. 1.

Referring now to FIG. 2, an illustrative target computing device 106 includes a compute engine 200, an I/O subsystem 206, one or more data storage devices 208, communication circuitry 210, and, in some embodiments, one or more peripheral devices 214. It should be appreciated that the target computing device 106 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 200 may be embodied as any type of device or collection of devices capable of performing the various compute functions as described herein. In some embodiments, the compute engine 200 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 200 may include, or may be embodied as, one or more processors 202 (i.e., one or more central processing units (CPUs)) and memory 204.

The processor(s) 202 may be embodied as any type of processor capable of performing the functions described herein. For example, the processor(s) 202 may be embodied as one or more single-core processors, one or more multi-core processors, a digital signal processor, a microcontroller, or other processor or processing/controlling circuit(s). In some embodiments, the processor(s) 202 may be embodied as, include, or otherwise be coupled to a field programmable gate array (FPGA), an application specific integrated circuit (ASIC), reconfigurable hardware or hardware circuitry, or other specialized hardware to facilitate performance of the functions described herein.

The memory 204 may be embodied as any type of volatile (e.g., dynamic random access memory (DRAM), etc.) or non-volatile memory or data storage capable of performing the functions described herein. It should be appreciated that the memory 204 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 200 is communicatively coupled to other components of the target computing device 106 via the I/O subsystem 206, which may be embodied as circuitry and/or components to facilitate input/output operations with the processor 202, the memory 204, and other components of the target computing device 106. For example, the I/O subsystem 206 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 206 may form a portion of a system-on-a-chip (SoC) and be incorporated, along with one or more of the processor 202, the memory 204, and other components of the target computing device 106, on a single integrated circuit chip.

The one or more data storage devices 208 may be embodied as any type of storage device(s) configured for short-term or long-term storage of data, such as, for example, memory devices and circuits, memory cards, hard disk drives, solid-state drives, or other data storage devices. Each data storage device 208 may include a system partition that stores data and firmware code for the data storage device 208. Each data storage device 208 may also include an operating system partition that stores data files and executables for an operating system.

The communication circuitry 210 may be embodied as any communication circuit, device, or collection thereof, capable of enabling communications between the target computing device 106 and other computing devices, as well as any network communication enabling devices, such as an access point, network switch/router, etc., to allow communication over the network 104. Accordingly, the communication circuitry 210 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication.

It should be appreciated that, in some embodiments, the communication circuitry 210 may include specialized circuitry, hardware, or combination thereof to perform pipeline logic (e.g., hardware algorithms) for performing the functions described herein, including processing network packets (e.g., parse received network packets, determine destination computing devices for each received network packets, forward the network packets to a particular buffer queue of a respective host buffer of the target computing device 106, etc.), performing computational functions, etc.

In some embodiments, performance of one or more of the functions of communication circuitry 210 as described herein may be performed by specialized circuitry, hardware, or combination thereof of the communication circuitry 210, which may be embodied as a system-on-a-chip (SoC) or otherwise form a portion of a SoC of the target computing device 106 (e.g., incorporated on a single integrated circuit chip along with a processor 202, the memory 204, and/or other components of the target computing device 106). Alternatively, in some embodiments, the specialized circuitry, hardware, or combination thereof may be embodied as one or more discrete processing units of the target computing device 106, each of which may be capable of performing one or more of the functions described herein.

The illustrative communication circuitry 210 includes a network interface controller (NIC) 212, also commonly referred to as a host fabric interface (HFI) in some embodiments (e.g., high-performance computing (HPC) environments). The NIC 212 may be embodied as one or more add-in-boards, daughtercards, network interface cards, controller chips, chipsets, or other devices that may be used by the target computing device 106. In some embodiments, the NIC 212 may be embodied as part of a system-on-a-chip (SoC) that includes one or more processors, or included on a multichip package that also contains one or more processors. In some embodiments, the NIC 212 may include a local processor (not shown) and/or a local memory (not shown) that are both local to the NIC 212. In such embodiments, the local processor of the NIC 212 may be capable of performing one or more of the functions of a processor 202 described herein.

Additionally or alternatively, in such embodiments, the local memory of the NIC 212 may be integrated into one or more components of the target computing device 106 at the board level, socket level, chip level, and/or other levels. For example, in some embodiments, the NIC 212 may be integrated with the processor 202, embodied as an expansion card coupled to the I/O subsystem 204 over an expansion bus (e.g., PCI Express), part of a SoC that includes one or more processors, or included on a multichip package that also contains one or more processors. Additionally or alternatively, in some embodiments, functionality of the NIC 212 may be integrated into one or more components of the target computing device 106 at the board level, socket level, chip level, and/or other levels.

The one or more peripheral devices 214 may include any type of device that is usable to input information into the source computing device 102. The peripheral devices 214 may be embodied as any auxiliary device usable to input information into the source computing device 102, such as a keyboard, a mouse, a microphone, a barcode reader, an image scanner, etc., or output information from the source computing device 102, such as a display, a speaker, graphics circuitry, a printer, a projector, etc. It should be appreciated that, in some embodiments, one or more of the peripheral devices 214 may function as both an input device and an output device (e.g., a touchscreen display, a digitizer on top of a display screen, etc.). It should be further appreciated that the types of peripheral devices 214 connected to the source computing device 102 may depend on, for example, the type and/or intended use of the source computing device 102. Additionally or alternatively, in some embodiments, the peripheral devices 214 may include one or more ports, such as a USB port, for example, for connecting external peripheral devices to the source computing device 102.

Referring back to FIG. 1, the network 104 may be embodied as any type of wired or wireless communication network, including but not limited to a wireless local area network (WLAN), a wireless personal area network (WPAN), a cellular network (e.g., Global System for Mobile Communications (GSM), Long-Term Evolution (LTE), etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, (high-speed) interconnects, etc.), as needed to facilitate communication between the source computing device 102 and the network computing device 106, which are not shown to preserve clarity of the description.

Figure 3:
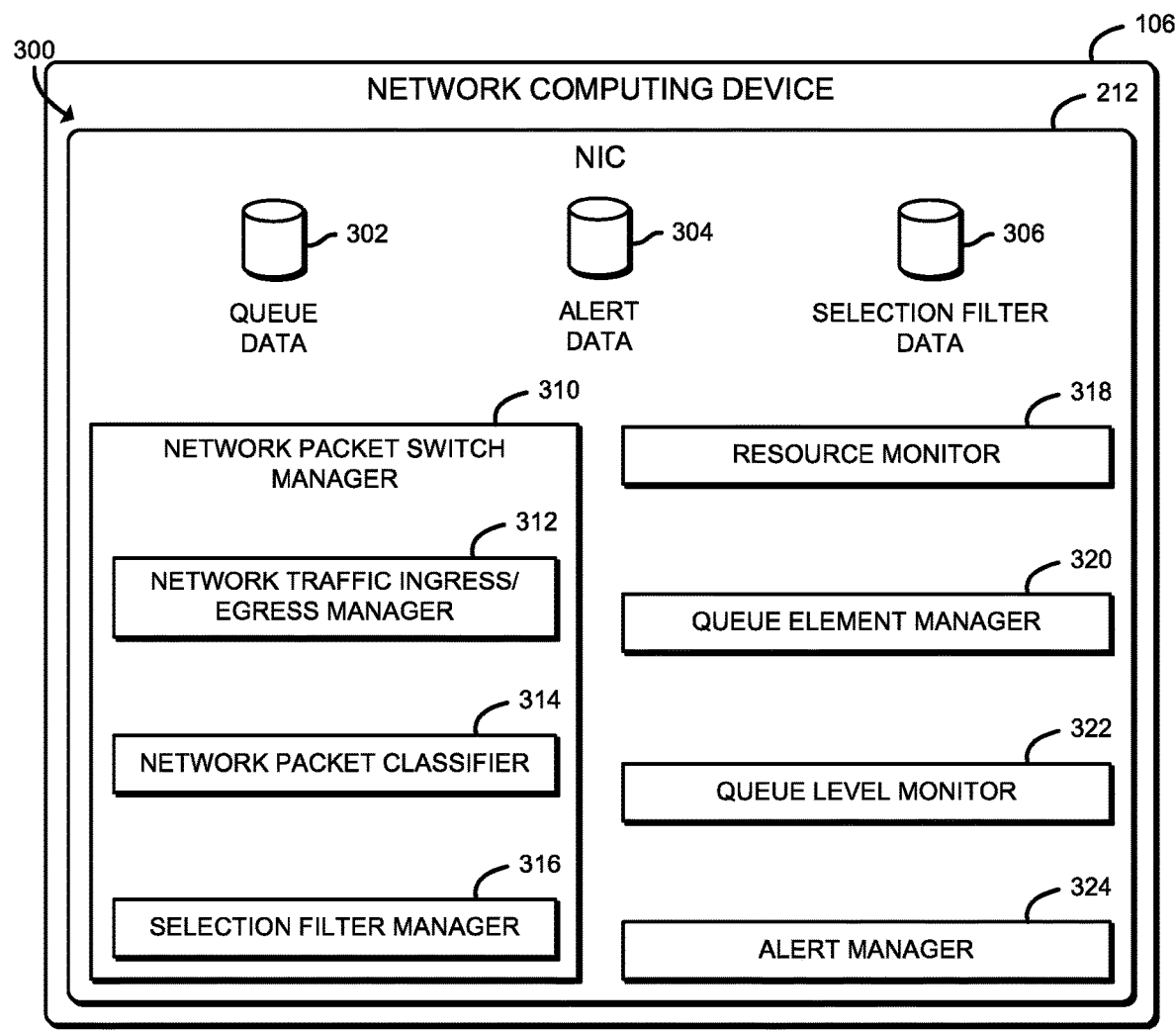
FIG. 3 is a simplified block diagram of at least one embodiment of an environment of the network computing device of the system of FIG. 1.

Referring now to FIG. 3, in use, the network computing device 106 establishes an environment 300 during operation. The illustrative environment 300 includes a network packet switch manager 310, a resource monitor 318, a queue element manager 320, a queue level monitor 322, and an alert manager 324. The various components of the environment 300 may be embodied as hardware, firmware, software, or a combination thereof. As such, in some embodiments, one or more of the components of the environment 300 may be embodied as circuitry or collection of electrical devices (e.g., network packet switch management circuitry 310, resource monitoring circuitry 318, queue element management circuitry 320, queue level monitoring circuitry 322, alert management circuitry 324, etc.).

It should be appreciated that, in such embodiments, one or more of the network packet switch management circuitry 310, the resource monitoring circuitry 318, the queue element management circuitry 320, the queue level monitoring circuitry 322, the alert management circuitry 324 may form a portion of one or more of the compute engine 200, the I/O subsystem 206, the communication circuitry 210 (e.g., the NIC 212 of the communication circuitry 210, as illustratively shown), and/or other components of the target computing device 106. Additionally, in some embodiments, one or more of the illustrative components may form a portion of another component and/or one or more of the illustrative components may be independent of one another. Further, in some embodiments, one or more of the components of the environment 300 may be embodied as virtualized hardware components or emulated architecture, which may be established and maintained by the compute engine 300 or other components of the target computing device 106. It should be appreciated that the target computing device 106 may include other components, sub-components, modules, sub-modules, logic, sub-logic, and/or devices commonly found in a computing device, which are not illustrated in FIG. 3 for clarity of the description.

In the illustrative environment 300, the target computing device 106 additionally includes queue data 302, alert data 304, and selection filter data 306, each of which may be accessed by the various components and/or sub-components of the target computing device 106. Additionally, it should be appreciated that in some embodiments at least a portion of the data stored in, or otherwise represented by, the queue data 302, the alert data 304, and the selection filter data 306 may be stored in additional or alternative storage locations (e.g., host memory of the target computing device 106). As such, although the various data utilized by the target computing device 106 is described herein as particular discrete data, such data may be combined, aggregated, and/or otherwise form portions of a single or multiple data sets, including duplicative copies, in other embodiments.

The network packet switch manager 310, which may be embodied as hardware, firmware, software, virtualized hardware, emulated architecture, and/or a combination thereof as discussed above, is configured to receive inbound and route/transmit outbound network traffic. To do so, the illustrative network packet switch manager 310 includes a network traffic ingress/egress manager 312, a network packet classifier 314, and a selection filter manager 316. The network traffic ingress/egress manager 304 is configured to facilitate inbound/outbound network communications (e.g., network traffic, network packets, network flows, etc.) to and from the target computing device 106. For example, the network traffic ingress/egress manager 304 is configured to manage (e.g., create, modify, delete, etc.) connections to physical and virtual network ports (i.e., virtual network interfaces) of the target computing device 106 (e.g., via the communication circuitry 210), as well as the ingress/egress buffers/queues associated therewith. In some embodiments, information associated with the header(s) and/or the payload of the network communications (e.g., messages, data, etc.) may be stored in the message data 302.

The network packet classifier 314 is configured to classify the received network packets to identify how to process a payload of the network packet and/or how/where to forward the network packet. To do so, the network packet classifier 314 is configured to parse at least a portion of a header and/or the payload of the network packet to determine an identifying characteristic usable to identify which services are to be performed thereon and/or how to forward the received network packet (e.g., the appropriate tunnel, egress port, destination media access control (MAC) address, etc.). The identifying characteristic may be any type of data that is usable to identify a flow, workload, data type, etc., of the network packet, such as a MAC address, a source interne protocol (IP) address, a destination IP address, a source port number, a destination port number, a protocol, etc.).

The selection filter manager 316 is configured to determine whether a network packet meets a predetermined criterion, or a predetermined set of criteria, for being forwarded in the event of an overflow condition or the detection of an overflow condition being imminent. To do so, the selection filter manager 316 is configured to compare one or more characteristics of the network packet against the predetermined criterion, or set of criteria. For example, the selection filter manager 316 may be configured to determine the criterion/criteria as a function of the classification of the received network, such as may be determined by the network packet classifier 314. In some embodiments, the criterion/criteria may be stored in the selection filter data 306.

The resource monitor 318, which may be embodied as hardware, firmware, software, virtualized hardware, emulated architecture, and/or a combination thereof as discussed above, is configured to monitor the resources of the NIC 212. To do so, the resource monitor 318 is configured to monitor any telemetry data of the NIC 212. Additionally, the resource monitor 318 is configured to monitor allocated and available resources, physical and/or virtual, of the NIC 212. It should be appreciated that, in some embodiments, the resource monitor 318 may be additionally configured to receive host resource metrics from a resource monitor of the network computing device 106 (e.g., via the monitoring agent 512 of FIGS. 5 and 6).

The queue element manager 320, which may be embodied as hardware, firmware, software, virtualized hardware, emulated architecture, and/or a combination thereof as discussed above, is configured to manage the received network packet queues. To do so, the queue element manager 320 is configured to identify which physical/virtual function corresponds to a received network packet, such as may be identified based on the classification (e.g., by the network packet classifier 314) or other characteristic of the received network packet. It should be appreciated that, in some embodiments, at least a portion of one or more of the functions described herein as being performed by the queue element manager 320 may be performed by the network traffic ingress/egress manager 312, or vice versa. In some embodiments, the queue information (e.g., head/tail information, element information, etc.) may be stored in the queue data 302.

The queue level monitor 322, which may be embodied as hardware, firmware, software, virtualized hardware, emulated architecture, and/or a combination thereof as discussed above, is configured to monitor the present levels of the network packet queues of the NIC 212. For example, the queue level monitor 322 may be configured to determine a present queue level of a global packet buffer of the NIC 212 and/or a destination queue of the NIC 212 (e.g., a virtual function queue, a virtual switch interface queue, etc.). To do so, the queue level monitor 322 may be configured to update the queue levels by polling each of the queues and/or receiving an indication of a present queue level from each of the queues, which may be received in response to on a timer or triggering event (e.g., an element being added or removed from the queue).

The queue level monitor 322 is additionally configured to detect whether a queue is full or has reached a preconfigured threshold set for that queue indicating the queue is full. To do so, the queue level monitor 322 is configured to compare a present level of the queue to its corresponding threshold level. For example, the queue level monitor 322 may receive an indication (e.g., from software in the host) which indicates a threshold level for a particular queue. Upon having determined that the queue is full or has reached the threshold level for that queue, the queue level monitor 322 may be configured to, in some embodiments, update a flag associated with the queue (e.g., an overflow condition flag) which can be checked (e.g., upon having received a packet) to determine whether the queue is full or has reached the threshold level for that queue.

In an illustrative example in which the NIC 212 has received a network packet (e.g., off the wire), the queue level monitor 322 is configured to determine and store a queue level of the corresponding receive queue (e.g., the global packet buffer, a destination queue, etc.) in which the receive network packet has been buffered. Additionally, upon having received another network packet which is to be enqueued in the same receive queue, the queue level monitor 322 is further configured to check whether a corresponding threshold (e.g., a receive queue threshold) has been reached. In some embodiments, the queue level data (e.g., queue levels, thresholds, flags, etc.) may be stored in the queue data 302.

The alert manager 324, which may be embodied as hardware, firmware, software, virtualized hardware, emulated architecture, and/or a combination thereof as discussed above, is configured to manage the alerts which are to be issued, such as may be issued during the detection of or the prospect of an overflow condition, such as may be detected by the queue level monitor 322. In furtherance of the previous illustrative example, the alert manager 324 may detect a condition (e.g., an overflow condition, an overflow imminent condition, etc.), such as by polling the respective overflow condition flag or having receiving an indication (e.g., from the queue level monitor 322) that an alert triggering condition has been detected. The alert manager 324 is additionally configured to set and check alert flags (e.g., a send alert once flag) to identify whether an alert for a particular condition has previously been sent and/or to determine whether an alert should be fired in the event a triggering condition has been detected (e.g., based on one or more configuration settings of the applicable alert).

Figure 4A:
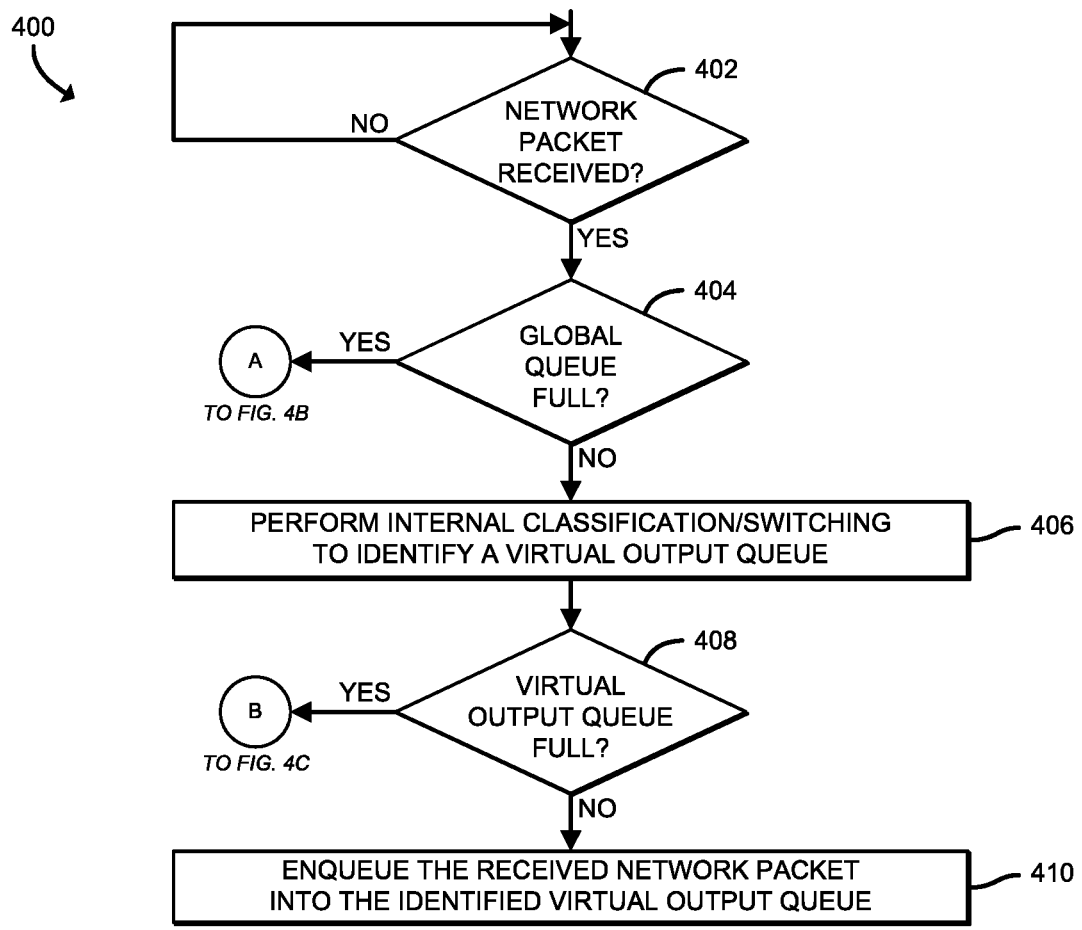
FIGS. 4A-4C are a simplified block diagram of at least one embodiment of a method for packet forwarding under ingress queue overflow conditions that may be executed by the network computing device of FIGS. 1-3.
Figure 4B:
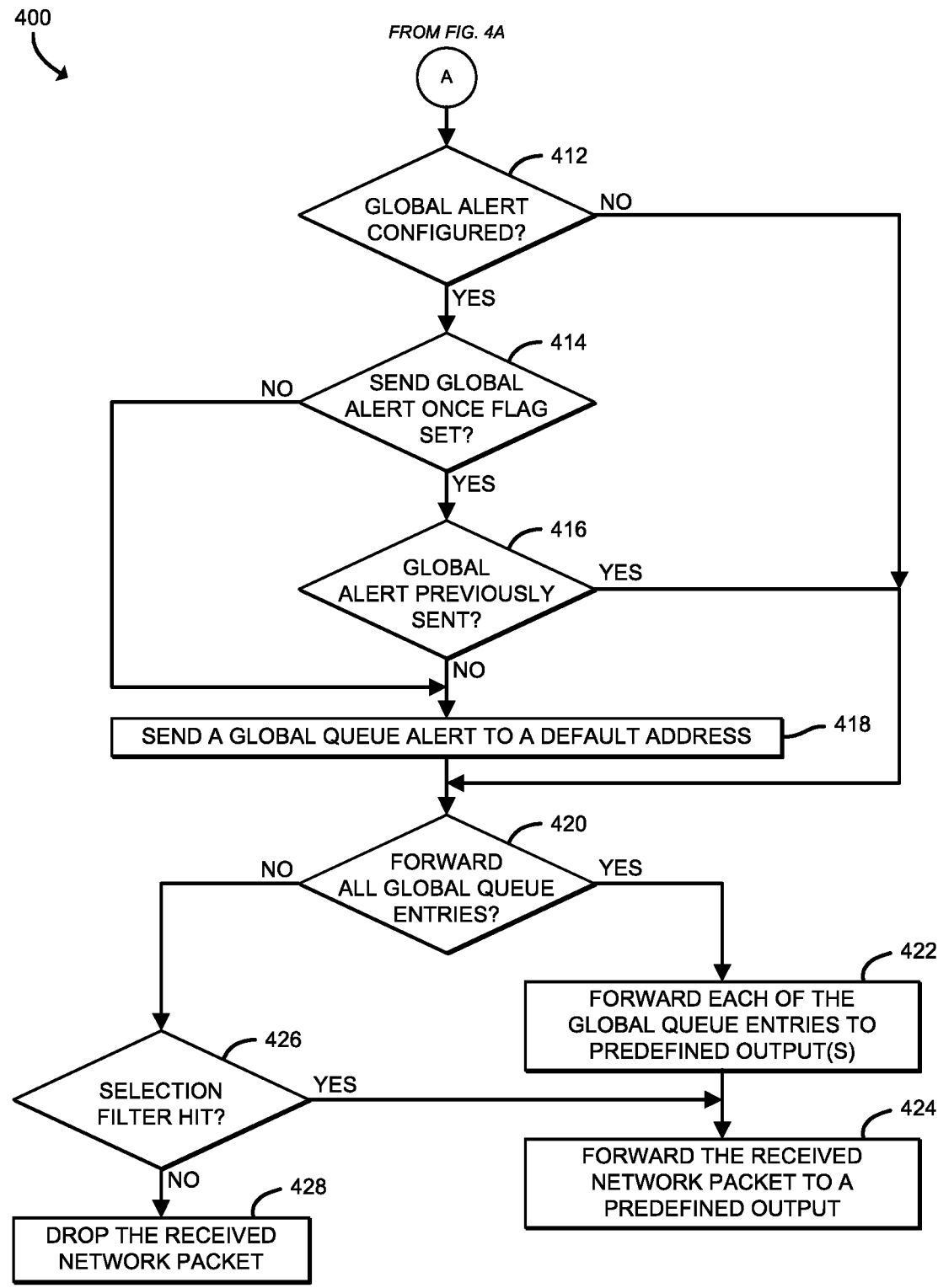
Figure 4C:
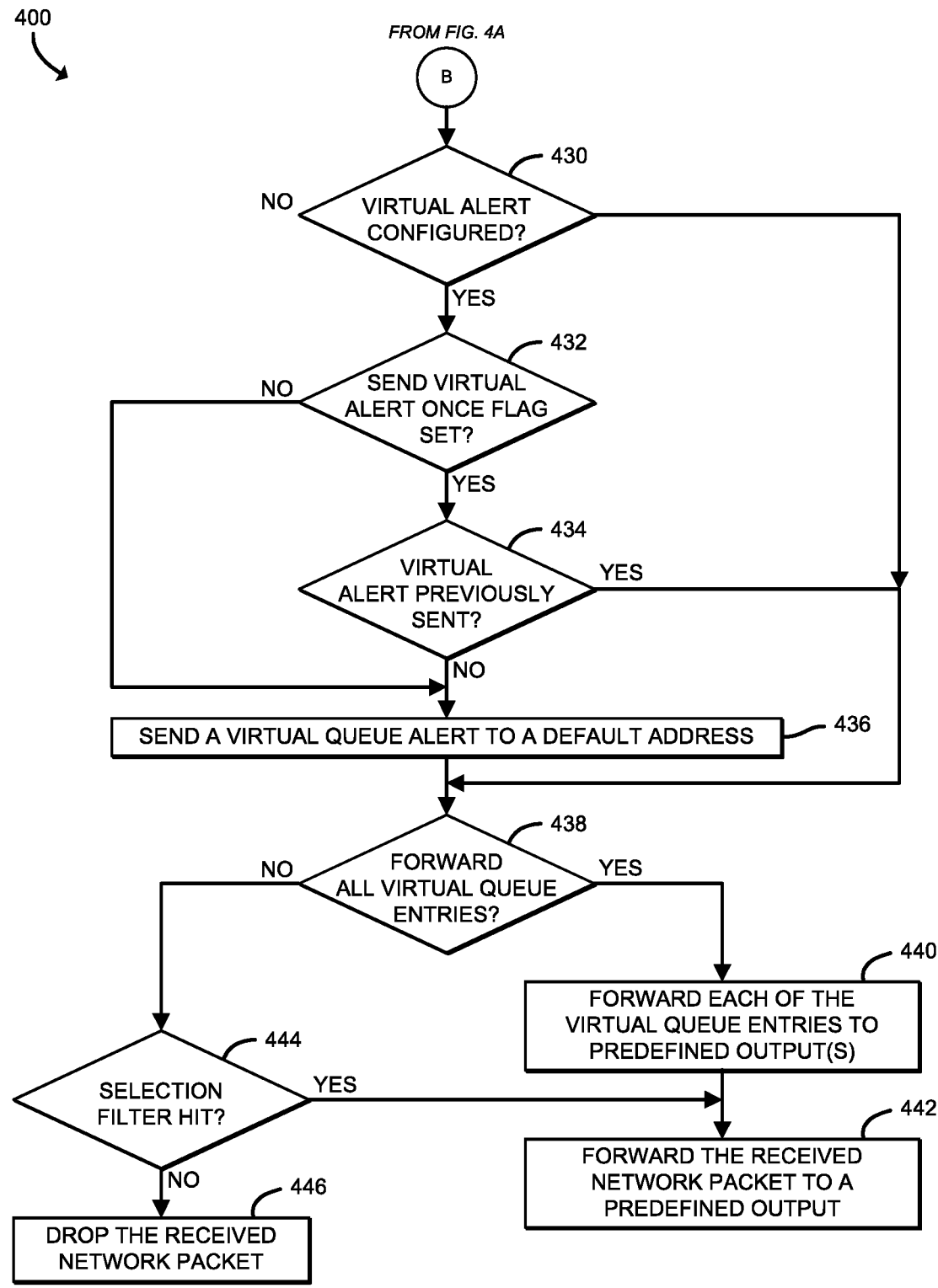

Referring now to FIGS. 4A-4C, a method 400 for packet forwarding under ingress queue overflow conditions is shown which may be executed by a computing device (e.g., the network computing device 106 of FIGS. 1-3), or more particularly by a NIC of the computing device (e.g., the illustrative NIC 212 of FIG. 3). The method 400 begins with block 402, in which the NIC 212 determines whether a network packet has been received. If so, the method 400 advances to block 404, in which the NIC 212 determines whether a global packet buffer of the NIC 212 is full or has reached a preconfigured threshold set for that queue indicating the queue is full. If the global packet buffer of the NIC 212 is full, the method 400 branches to block 412, which is shown in FIG. 4B and is described below; otherwise, the method 400 branches to block 406. In block 406, the NIC 212 performs internal classification and switching to identify a local destination queue (i.e., a default destination/output queue on the host which can be assigned to a virtual or physical function) which corresponds to the received network packet. In block 408, the NIC 212 determines whether the identified local destination queue is full. If so, the method 400 branches to block 430, which is shown in FIG. 4C and is described below; otherwise, if the identified local destination queue is not full, the method 400 branches to block 410. In block 410, the NIC 212 enqueues the received network packet into the identified local destination queue.

Referring again to block 404, as described previously, if the NIC 212 determines the global packet buffer of the NIC 212 is full, the method 400 branches to block 412 of FIG. 4B. In block 412, the NIC 212 determines whether a global alert has been configured. If not, the method 400 jumps to block 420, in which the NIC 212 determines whether to forward the entire global packet buffer of received messages; otherwise, if the global alert has been configured, the method 400 advances to block 414 to determine whether a flag has been set directing the NIC 212 to only send the global alert one time (i.e., a send global alert once flag). If the send global alert once flag is set, the method 400 advances to block 416; otherwise, the method 400 jumps to block 418. In block 416, the NIC 212 determines whether the global alert has been previously sent and, if so, the method 400 jumps to block 420; otherwise, the method 400 advances to block 418. In block 418, the NIC 212 sends a global packet buffer alert to a default address. It should be appreciated that the default address is part of the data/ settings (e.g., stored in the alert data 304 of FIG. 3) which are provided by software during configuration (e.g., via the alert manager 324 of FIG. 3).

In block 420, the NIC 212 determines whether to forward all of the global packet buffer entries based on selection filter data. If so, the method 400 branches to block 422, in which the NIC 212 forwards each of the global packet buffer entries to corresponding predefined outputs (e.g., predefined ports, MAC addresses, tunnels, etc.). It should be appreciated that the NIC 212 may be further configured to change an internal state to of the global packet buffer to a forwarding state while emptying the global packet buffer, such that if another network packet is received at the NIC 212 it may then be forwarded to a destination computing device. In block 424 the NIC 212 forwards the received network packet to a predefined output (e.g., a predefined port, MAC address, tunnel, etc.).

Referring back to block 420, if the NIC 212 determines not to forward all the entries of the global packet buffer, the method 400 branches to block 426, in which the NIC 212 determines whether one or more properties of the received network packet match corresponding values of a selection filter. If so, the method 400 branches to block 424, in which the NIC 212 forwards the received network packet to the predefined output. Otherwise, if the NIC 212 determines that the one or more properties of the received network packet do not match corresponding values of the selection filter, the method 400 branches to block 428, in which the NIC 212 drops the received network packet. In other words, if any selection filters are set, then the received network packet will be forwarded only if at least one of the selection filters are hit; otherwise, if no filters are set, then all of the network packets of the global packet buffer entries will be forwarded.

Referring back to block 408 of FIG. 4A, as described previously, if the NIC 212 determines the identified local destination queue is full, the method 400 branches to block 430 of FIG. 4C. In block 430, the NIC 212 determines whether a virtual alert has been configured. If not, the method 400 jumps to block 438, in which the NIC 212 determines whether to forward the entire destination queue of received messages; otherwise, if the virtual alert has been configured, the method 400 advances to block 432 to determine whether a flag has been set directing the NIC 212 to only send the virtual alert one time (i.e., a send virtual alert once flag). If the send virtual alert once flag is set, the method 400 advances to block 434; otherwise, the method 400 jumps to block 436. In block 434, the NIC 212 determines whether the virtual alert has been previously sent and, if so, the method 400 jumps to block 438; otherwise, the method 400 advances to block 436. In block 436, the NIC 212 sends a destination queue alert to a default address, if previously provided (e.g., by software).

In block 438, the NIC 212 determines whether to forward all of the destination queue entries. If so, the method 400 branches to block 440, in which the NIC 212 forwards each of the destination queue entries to corresponding predefined outputs (e.g., predefined ports, MAC addresses, tunnels, etc.). In block 442 the NIC 212 forwards the received network packet to a predefined output (e.g., a predefined port, MAC address, tunnel, etc.). Referring back to block 438, if the NIC 212 determines not to forward all the entries of the destination queue, the method 400 branches to block 444, in which the NIC 212 determines whether one or more properties of the received network packet match corresponding values of a selection filter. If so, the method 400 branches to block 442, in which the NIC 212 forwards the received network packet to the predefined output. Otherwise, if the NIC 212 determines that the one or more properties of the received network packet do not match corresponding values of the selection filter, the method 400 branches to block 446, in which the NIC 212 drops the received network packet.

Figure 5:
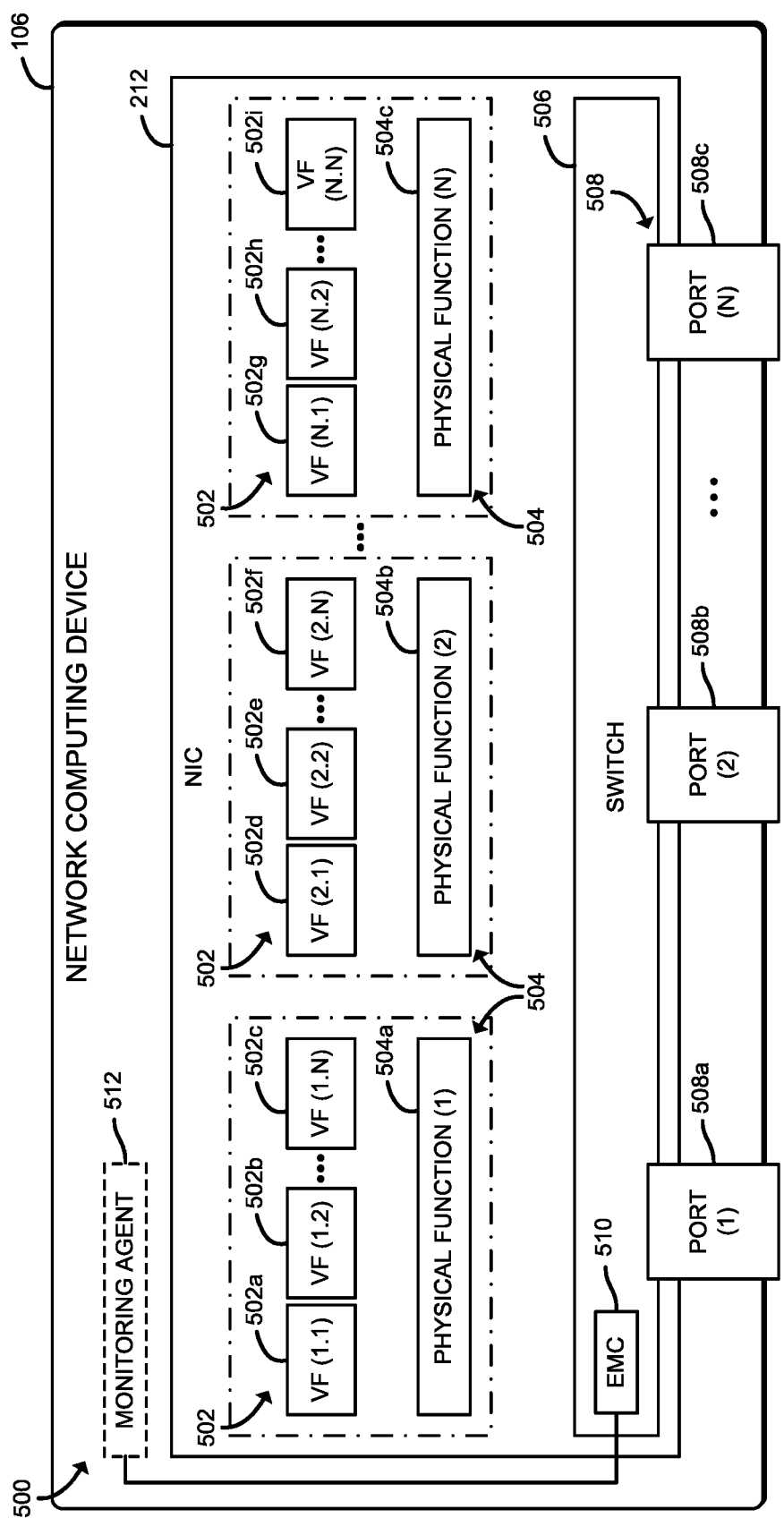
FIG. 5 is a simplified block diagram of at least one illustrative embodiment of the network computing device of FIGS. 1-3 which includes a network interface controller (NIC) on which the physical and virtual elements for packet forwarding under ingress queue overflow conditions are integrated thereon.

Referring now to FIG. 5, in use, the network computing device 106 establishes an environment 500 during operation. The illustrative environment 500 includes multiple ports 508 of an embedded switch 506 of the illustrative NIC 212. The illustrative multiple ports 508 includes a first port 508 designated as port (1) 508a, a second port 508 designated as port (2) 508b, and a third port 508 designated as port (N) 508c (i.e., wherein port (N) 508c designates the "Nth" port 508 and "N" is a positive integer). The environment 500 additionally includes multiple physical functions 504, each of which is communicatively coupled to a designated port 508 and multiple virtual functions 502. As illustratively shown, the physical functions 504 include a first physical function 504 designated as physical function (1) 504a, a second physical function 504 designated as physical function (2) 504b, and a third physical function 504 designated as physical function (N) 504c (i.e., wherein physical function (N) 504c designates the "Nth" physical function 504 and "N" is a positive integer). It should be appreciated that each physical function 504 is communicatively coupled to a particular port 508. For example, port (1) 508a is communicatively coupled to physical function (1) 504a, port (2) 508b is communicatively coupled to physical function (2) 504b, and port (N) 508c is communicatively coupled to physical function (N) 504c.

Additionally, each physical function 504 is further communicatively coupled to one or more virtual functions. For example, the physical function (1) 504a is communicatively coupled to port (1) 508a and to multiple virtual functions 502. It should be appreciated that the designation of each of the virtual functions 502 includes a mapping reference to the associated physical function 504 and the respective instance of the virtual function itself. For example, a virtual function 502 designated as virtual function (X.Y) indicates the virtual function 502 is the "Yth" virtual function instance associated with the "Xth" physical function 504 (i.e., wherein "X" and "Y" are positive integers).

As illustratively shown, the virtual functions 502 associated with the physical function (1) 504a include a first virtual function designated as virtual function (1.1) 502a, a second virtual function designated as virtual function (1.2) 502b, and a third virtual function designated as virtual function (1.N) 502c. Similarly, the illustrative virtual functions 502 associated with the physical function (2) 504b include a first virtual function designated as virtual function (2.1) 502d, a second virtual function designated as virtual function (2.2) 502e, and a third virtual function designated as virtual function (2.N) 502f. Finally, the illustrative virtual functions 502 associated with the physical function (N) 504c include a first virtual function designated as virtual function (N.1) 502g, a second virtual function designated as virtual function (N.2) 502h, and a third virtual function designated as virtual function (N.N) 502i.

As described previously, the virtual functions 502 operate under the respective physical function 504 on the same NIC port 508. Accordingly, the virtual functions 502 therefore have no access to the global resources of the NIC 212 which are shared between other functions for the same NIC port 508. It should be further appreciated that each virtual function 502 has basic access to the queue resources and control structures of the queues assigned to it. In other words, for global resource access, a virtual function 502 sends a request to the physical function 504 for that port 508, and the physical function 504 operates on the global resources on behalf of the virtual function 502. In some embodiments, such as an SR-IOV enabled NIC, the NIC 212 provides a memory buffer for each virtual function 502 (e.g., using out-of-band communications).

The illustrative environment 500 additionally includes an optional monitoring agent 512 of the network computing device 106 communicatively coupled to an embedded microcontroller 510 of the embedded switch 506 on the NIC 212. The monitoring agent 512 is configured to monitor resources (e.g., memory, compute, health, etc.) of the network computing device 106 and provide metrics related to the monitored resources to the embedded microcontroller 510, such that the embedded microcontroller 510 can make switching decisions based at least in part on the host resource metrics.

In use, as described previously, a port 508 receives network packets (i.e., from the wire) and the embedded switch 506 performs a classification of the received network packet and determines (e.g., based on configuration information received/managed by the embedded microcontroller 510) the appropriate virtual function 502 to process the received network packet. As also described previously, the classification may be based on some characteristic or property of the received network packet. Upon performing the classification, the embedded switch 506 directs each received network packet to a virtual function 502 via a corresponding physical function 504 for the processing of at least a portion of the received network packet.

In an illustrative example in which a network packet is received at port (1) 508a. Under normal conditions, the embedded switch 506 is configured to direct the received network packet to virtual function (1.1) 502*a* via the physical function (1) 504*a*. However, based on certain conditions, the embedded microcontroller 510 may reconfigure the embedded switch 506 to redirect the network packet to a different virtual function (e.g., virtual function (2.2) 502*e* via physical function (2) 504*b*). Such reconfiguration conditions may be based on queue information of the receive queue associated with virtual function (1.1) 502*a*, collected by the NIC 212 (e.g., via the queue level monitor 322 of FIG. 3), which indicates that the virtual function (1.1) 502*a* is no longer polling network packet queues or is otherwise not active (e.g., suffering from an overflow condition, a queue threshold level has been reached, no receive descriptors are available, etc.). Alternatively, the embedded microcontroller 510 may reconfigure the embedded switch 506 to redirect the network packet to another network computing device 106 (e.g., a standby computing device).

Figure 6:
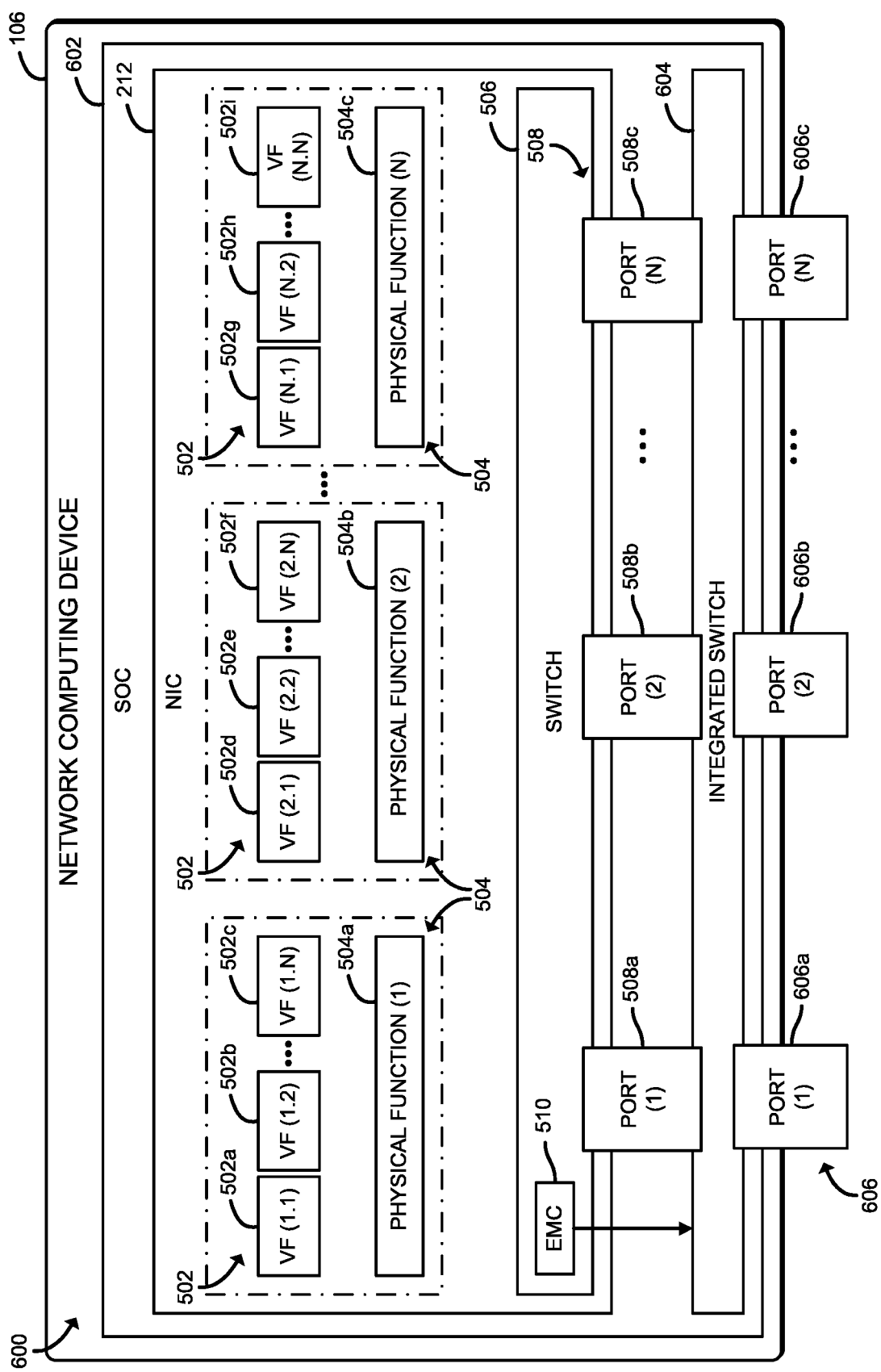
FIG. 6 is a simplified block diagram of at least one embodiment of the network computing device of FIGS. 1-3 which includes a system-on-a-chip (SoC) that includes a switch and a NIC on which the physical and virtual elements for packet forwarding under ingress queue overflow conditions are integrated thereon.

Referring now to FIG. 6, in use, the network computing device 106 establishes an environment 600 during operation. Similar to the illustrative environment 500 of FIG. 5, the illustrative environment 600 includes multiple ports 508 of a embedded switch 506 of the illustrative NIC 212, as well as the previously described physical functions 504 and virtual functions 502. However, the illustrative environment 600 additionally includes an integrated switch 604 which forms a SoC 602 that includes the NIC 212. As illustratively shown, the integrated switch 604 includes multiple ingress ports 606, which are configured to receive the network packets from the wire and are communicatively coupled to a corresponding port 508 of the embedded switch 506 of the NIC 212.

EXAMPLES

Illustrative examples of the technologies disclosed herein are provided below. An embodiment of the technologies may include any one or more, and any combination of, the examples described below.

Example 1 includes a computing device for packet forwarding under ingress queue overflow conditions, the computing device comprising a compute engine; and a network interface controller (NIC) to receive a network packet from another computing device; determine whether a global packet buffer of the NIC is full; determine, in response to a determination that the global packet buffer is full, whether to forward all the global packet buffer entries; compare, in response to a determination not to forward all the global packet buffer entries, a selection filter to one or more characteristics of the received network packet; and forward, in response to a determination that the selection filter matches the one or more characteristics of the received network packet, the received network packet to a predefined output.

Example 2 includes the subject matter of Example 1, and wherein the NIC is further to determine, in response to a determination that the global packet buffer is full, whether to send a global packet buffer alert; and send, in response to a determination to send the global packet buffer alert, the global packet buffer alert to a default configured address.

Example 3 includes the subject matter of any of Examples 1 and 2, and wherein the NIC is further to drop, in response to a result of the comparison which indicated the selection filter does not match the one or more characteristics of the received network packet, the received network packet.

Example 4 includes the subject matter of any of Examples 1-3, and wherein the NIC is further to perform, in response to a determination that the global packet buffer is not full, an internal classification as a function of the one or more characteristics of the received network packet; and identify a local destination queue associated with the received network packet as a function of the internal classification.

Example 5 includes the subject matter of any of Examples 1-4, and wherein the NIC is further to determine whether the identified local destination queue is full; determine, in response to a determination that the local destination queue is not full, whether to forward all the local destination queue entries; compare, in response to a determination not to forward all the local destination queue entries, the selection filter to the one or more characteristics of the received network packet; and forward, in response to a result of the comparison which indicated the selection filter matched the one or more characteristics of the received network packet, the received network packet to the predefined output.

Example 6 includes the subject matter of any of Examples 1-5, and wherein the NIC is further to determine, in response to a determination that the global packet buffer is full, whether to send a destination queue alert; and send, in response to a determination to send the destination queue alert, the destination queue alert to a default address.

Example 7 includes the subject matter of any of Examples 1-6, and wherein to determine whether to send the destination queue alert comprises to determine whether to send the destination queue alert as a function of a virtual alert once flag setting and a determination as to whether the destination queue alert has previously been sent, wherein the virtual alert once flag setting indicates whether to only send the destination queue alert one time.

Example 8 includes the subject matter of any of Examples 1-7, and wherein the NIC is further to drop, in response to a result of the comparison which indicated the selection filter does not match the one or more characteristics of the received network packet, the received network packet.

Example 9 includes the subject matter of any of Examples 1-8, and wherein the NIC is further to enqueue, in response to a determination that the local destination queue is full, the received network packet into the identified local destination queue.

Example 10 includes the subject matter of any of Examples 1-9, and wherein the predefined output comprises one of a predefined port, a predefined media access control (MAC) address, or a predefined tunnel.

Example 11 includes the subject matter of any of Examples 1-10, and wherein the NIC is further to change, subsequent to a determination to forward all the global queue entries, an internal state to of the global packet buffer to a forwarding state; receive another network packet from the other computing device; and forward, subsequent to a determination that the internal state of the global packet buffer is in the forwarding state, the received other packet to a destination computing device.

Example 12 includes one or more machine-readable storage media comprising a plurality of instructions stored thereon that, in response to being executed, cause a computing device to receive, by a network interface controller (NIC) of the computing device, a network packet from another computing device; determine, by the NIC, whether a global packet buffer of the NIC is full; determine, by the NIC and in response to a determination that the global packet buffer is full, whether to forward all the global packet buffer entries; compare, by the NIC and in response to a determination not to forward all the global packet buffer entries, a selection filter to one or more characteristics of the received network packet; and forward, by the NIC and in response to a determination that the selection filter matches the one or more characteristics of the received network packet, the received network packet to a predefined output.

Example 13 includes the subject matter of Example 12, and wherein the plurality of instructions further cause the computing device to determine, by the NIC and in response to a determination that the global packet buffer is full, whether to send a global packet buffer alert; and send, by the NIC and in response to a determination to send the global packet buffer alert, the global packet buffer alert to a default configured address.

Example 14 includes the subject matter of any of Examples 12 and 13, and wherein the plurality of instructions further cause the computing device to drop, by the NIC and in response to a result of the comparison which indicated the selection filter does not match the one or more characteristics of the received network packet, the received network packet.

Example 15 includes the subject matter of any of Examples 12-14, and wherein the plurality of instructions further cause the computing device to perform, by the NIC and in response to a determination that the global packet buffer is not full, an internal classification as a function of the one or more characteristics of the received network packet; and identify, by the NIC, a local destination queue associated with the received network packet as a function of the internal classification.

Example 16 includes the subject matter of any of Examples 12-15, and wherein the plurality of instructions further cause the computing device to determine, by the NIC, whether the identified local destination queue is full; determine, by the NIC and in response to a determination that the local destination queue is not full, whether to forward all the local destination queue entries; compare, by the NIC and in response to a determination not to forward all the local destination queue entries, the selection filter to the one or more characteristics of the received network packet; and forward, by the NIC and in response to a result of the comparison which indicated the selection filter matched the one or more characteristics of the received network packet, the received network packet to the predefined output.

Example 17 includes the subject matter of any of Examples 12-16, and wherein the plurality of instructions further cause the computing device to determine, by the NIC and in response to a determination that the global packet buffer is full, whether to send a destination queue alert; and send, by the NIC and in response to a determination to send the destination queue alert, the destination queue alert to a default address.

Example 18 includes the subject matter of any of Examples 12-17, and wherein to determine whether to send the destination queue alert comprises to determine whether to send the destination queue alert as a function of a virtual alert once flag setting and a determination as to whether the destination queue alert has previously been sent, wherein the virtual alert once flag setting indicates whether to only send the destination queue alert one time.

Example 19 includes the subject matter of any of Examples 12-18, and wherein the plurality of instructions further cause the computing device to drop, by the NIC and in response to a result of the comparison which indicated the selection filter does not match the one or more characteristics of the received network packet, the received network packet.

Example 20 includes the subject matter of any of Examples 12-19, and wherein the plurality of instructions further cause the computing device to enqueue, by the NIC and in response to a determination that the local destination queue is full, the received network packet into the identified local destination queue.

Example 21 includes the subject matter of any of Examples 12-20, and wherein the predefined output comprises one of a predefined port, a predefined media access control (MAC) address, or a predefined tunnel.

Example 22 includes the subject matter of any of Examples 12-21, and wherein the plurality of instructions further cause the computing device to change, by the NIC and subsequent to a determination to forward all the global queue entries, an internal state to of the global packet buffer to a forwarding state; receive, by the NIC, another network packet from the other computing device; and forward, by the NIC, subsequent to a determination that the internal state of the global packet buffer is in the forwarding state, the received other packet to a destination computing device.

Example 23 includes a computing device for packet forwarding under ingress queue overflow conditions, the computing device comprising circuitry for receiving a network packet from another computing device; means for determining whether a global packet buffer of the NIC is full; means for determining, in response to a determination that the global packet buffer is full, whether to forward all the global packet buffer entries; means for comparing, in response to a determination not to forward all the global packet buffer entries, a selection filter to one or more characteristics of the received network packet; and circuitry for forwarding, in response to a determination that the selection filter matches the one or more characteristics of the received network packet, the received network packet to a predefined output.

Example 24 includes the subject matter of Example 23, and wherein the computing device is further to means for determining, in response to a determination that the global packet buffer is full, whether to send a global packet buffer alert; and means for send, in response to a determination to send the global packet buffer alert, the global packet buffer alert to a default configured address.

Example 25 includes the subject matter of any of Examples 23 and 24, and wherein the computing device is further to means for performing, in response to a determination that the global packet buffer is not full, an internal classification as a function of the one or more characteristics of the received network packet; means for identifying a local destination queue associated with the received network packet as a function of the internal classification; means for determining whether the identified local destination queue is full; means for determining, in response to a determination that the local destination queue is not full, whether to forward all the local destination queue entries; means for comparing, in response to a determination not to forward all the local destination queue entries, the selection filter to the one or more characteristics of the received network packet; and circuitry for forwarding, in response to a result of the comparison which indicated the selection filter matched the one or more characteristics of the received network packet, the received network packet to the predefined output.

The invention claimed is:

1. A computing device for packet forwarding, the computing device comprising:
   a network interface controller (NIC) to:
   receive a network packet from another computing device;
   determine whether a packet buffer for a virtual function associated with a physical function of the NIC has reached a threshold;

determine, in response to a determination that the packet buffer has reached the threshold, whether to forward packet buffer entries to another NIC;

perform, in response to a determination that the packet buffer has not reached the threshold, an internal classification as a function of one or more characteristics of the received network packet; and identify a destination queue associated with the received network packet as a function of the internal classification.

2. The computing device of claim 1, wherein the NIC is further to:

determine, in response to a determination that the packet buffer has reached the threshold, whether to send a packet buffer alert; and send, in response to a determination to send the packet buffer alert, the packet buffer alert to a default configured address.

3. The computing device of claim 1, wherein the NIC is further to drop, in response to the determination that the packet buffer has reached the threshold, the received network packet.

4. The computing device of claim 1, wherein the NIC is further to:

determine whether the identified destination queue has reached the threshold;

determine, in response to a determination that the destination queue has not reached the threshold, whether to forward destination queue entries;

compare, in response to a determination not to forward the destination queue entries, a selection filter to the one or more characteristics of the received network packet; and forward, in response to the selection filter matched the one or more characteristics of the received network packet, the received network packet to a predefined output.

5. The computing device of claim 4, wherein the NIC is further to:

determine, in response to a determination that the packet buffer has reached the threshold, whether to send a destination queue alert; and send, in response to a determination to send the destination queue alert, the destination queue alert to a default address.

6. The computing device of claim 5, wherein to determine whether to send the destination queue alert comprises to determine whether to send the destination queue alert as a function of a virtual alert once flag setting and a determination as to whether the destination queue alert has previously been sent, wherein the virtual alert once flag setting indicates whether to only send the destination queue alert one time.

7. The computing device of claim 4, wherein the NIC is further to drop, in response to the selection filter does not match the one or more characteristics of the received network packet, the received network packet.

8. The computing device of claim 1, wherein the NIC is further to enqueue, in response to a determination that the destination queue has reached the threshold, the received network packet into the identified destination queue.

9. The computing device of claim 4, wherein the predefined output comprises one of a predefined port, a predefined media access control (MAC) address, or a predefined tunnel.

10. The computing device of claim 1, wherein the NIC is further to:

change, subsequent to a determination to forward queue entries, an internal state to of the packet buffer to a forwarding state;

receive another network packet from the other computing device; and forward, subsequent to a determination that the internal state of the packet buffer is in the forwarding state, the received other packet to a destination computing device.

11. One or more non-transitory machine-readable storage media comprising a plurality of instructions stored thereon that, in response to being executed, cause a computing device to:

receive, by a network interface controller (NIC) of the computing device, a network packet from another computing device;

determine, by the NIC, whether a packet buffer for a virtual function associated with a physical function of the NIC has reached a threshold;

determine, by the NIC and in response to a determination that the packet buffer has reached the threshold, whether to forward packet buffer entries to another packet buffer of the NIC;

perform, in response to a determination that the packet buffer has not reached the threshold, an internal classification as a function of one or more characteristics of the received network packet; and identify a local destination queue associated with the received network packet as a function of the internal classification.

12. The one or more non-transitory machine-readable storage media of claim 11, wherein the plurality of instructions further cause the computing device to:

determine, by the NIC and in response to a determination that the packet buffer has reached the threshold, whether to send a packet buffer alert; and send, by the NIC and in response to a determination to send the packet buffer alert, the packet buffer alert to a default configured address.

13. The one or more non-transitory machine-readable storage media of claim 11, wherein the plurality of instructions further cause the computing device to drop, by the NIC and in response to packet the determination that the packet buffer has reached the threshold, the received network packet.

14. The one or more non-transitory machine-readable storage media of claim 11, wherein the plurality of instructions further cause the computing device to:

determine, by the NIC, whether the identified local destination queue has reached the threshold;

determine, by the NIC and in response to a determination that the local destination queue has not reached the threshold, whether to forward local destination queue entries;

compare, by the NIC and in response to a determination not to forward the local destination queue entries, a selection filter to the one or more characteristics of the received network packet; and forward, by the NIC and in response to the selection filter matched the one or more characteristics of the received network packet, the received network packet to a predefined output.

15. The one or more non-transitory machine-readable storage media of claim 14, wherein the plurality of instructions further cause the computing device to:

determine, by the NIC and in response to a determination that the packet buffer has reached the threshold, whether to send a destination queue alert; and send, by the NIC and in response to a determination to send the destination queue alert, the destination queue alert to a default address.

16. The one or more non-transitory machine-readable storage media of claim 15, wherein to determine whether to send the destination queue alert comprises to determine whether to send the destination queue alert as a function of a virtual alert once flag setting and a determination as to whether the destination queue alert has previously been sent, wherein the virtual alert once flag setting indicates whether to only send the destination queue alert one time.

17. The one or more non-transitory machine-readable storage media of claim 14, wherein the plurality of instructions further cause the computing device to drop, by the NIC and in response to the selection filter does not match the one or more characteristics of the received network packet, the received network packet.

18. The one or more non-transitory machine-readable storage media of claim 11, wherein the plurality of instructions further cause the computing device to enqueue, by the NIC and in response to a determination that the local destination queue has reached the threshold, the received network packet into the identified local destination queue.

19. The one or more non-transitory machine-readable storage media of claim 14, wherein the predefined output comprises one of a predefined port, a predefined media access control (MAC) address, or a predefined tunnel.

20. The one or more non-transitory machine-readable storage media of claim 11, wherein the plurality of instructions further cause the computing device to:

change, by the NIC and subsequent to a determination to forward queue entries, an internal state of the packet buffer to a forwarding state;

receive, by the NIC, another network packet from the other computing device; and forward, by the NIC, subsequent to a determination that the internal state of the packet buffer is in the forwarding state, the received other packet to a destination computing device.

21. A computing device for packet forwarding, the computing device comprising:

circuitry for receiving a network packet from another computing device;

means for determining whether a packet buffer for a virtual function associated with a physical function of a NIC has reached a threshold;

means for determining, in response to a determination that the packet buffer has reached the threshold, whether to forward packet buffer entries to another NIC;

means for performing, in response to a determination that the packet buffer has not reached the threshold, an internal classification as a function of one or more characteristics of the received network packet; and means for identifying a local destination queue associated with the received network packet as a function of the internal classification.

22. The computing device of claim 21, wherein the computing device is further to:

means for determining, in response to a determination that the packet buffer has reached the threshold, whether to send a packet buffer alert; and means for send, in response to a determination to send the packet buffer alert, the packet buffer alert to a default configured address.

23. The computing device of claim 21, wherein the computing device is further to:

means for determining whether the identified destination queue has reached the threshold;

means for determining, in response to a determination that the destination queue has not reached the threshold, whether to forward destination queue entries;

means for comparing, in response to a determination not to forward the destination queue entries, a selection filter to one or more characteristics of the received network packet; and circuitry for forwarding, in response to the selection filter matched the one or more characteristics of the received network packet, the received network packet to a predefined output.

* * * * *

UNITED STATES PATENT AND TRADEMARK OFFICE
CERTIFICATE OF CORRECTION

PATENT NO. : 11,646,980 B2
APPLICATION NO. : 15/941969
DATED : May 9, 2023
INVENTOR(S) : Andrey Chilikin and Vadim Sukhomlinov It is certified that error appears in the above-identified patent and that said Letters Patent is hereby corrected as shown below:

In the Claims

Column 17, Lines 66 - Column 18, Lines 1-9, Claim 10 should read as follows:
The computing device of claim 1, wherein the NIC is further to:
    change, subsequent to a determination to forward queue entries, an internal state of the packet buffer to a forwarding state;
    receive another network packet from the other computing device; and
    forward, subsequent to a determination that the internal state of the packet buffer is in the forwarding state, the received other packet to a destination computing device.

Signed and Sealed this
Twenty-seventh Day of June, 2023

Katherine Kelly Vidal
*Director of the United States Patent and Trademark Office*